(12) United States Patent
Dick et al.

(10) Patent No.: US 8,367,574 B2
(45) Date of Patent: Feb. 5, 2013

(54) HIGHLY THERMALLY STRESSABLE GLASS FOR LIGHT BULBS AND ITS USE

(75) Inventors: Erhard Dick, Pechbrunn (DE); Ingo Kipnik, Weiden (DE)

(73) Assignee: Schott AG, Mainz (DE)

( * ) Notice: Subject to any disclaimer, the term of this patent is extended or adjusted under 35 U.S.C. 154(b) by 357 days.

(21) Appl. No.: 12/861,944

(22) Filed: Aug. 24, 2010

(65) Prior Publication Data
US 2011/0053756 A1   Mar. 3, 2011

(30) Foreign Application Priority Data
Aug. 27, 2009   (DE) .......... 10 2009 039 071

(51) Int. Cl.
*C03C 3/087* (2006.01)
*C03C 3/091* (2006.01)
*C03C 3/093* (2006.01)
*H01J 17/16* (2012.01)

(52) U.S. Cl. ........... 501/70; 501/66; 501/67; 501/64; 313/636

(58) Field of Classification Search ........... 501/64, 501/66, 67, 70; 313/636
See application file for complete search history.

(56) References Cited

U.S. PATENT DOCUMENTS

| | | | |
|---|---|---|---|
| 3,310,413 A | 3/1967 | Harrington | |
| 3,496,401 A | 2/1970 | Dumbaugh, Jr. | |
| 4,441,051 A | 4/1984 | Thomas | |
| 4,737,685 A | 4/1988 | Thomas | |
| 5,854,153 A * | 12/1998 | Kohli | 501/70 |
| 6,069,100 A * | 5/2000 | Naumann et al. | 501/67 |
| 6,074,969 A | 6/2000 | Naumann et al. | |
| 6,300,264 B1 * | 10/2001 | Ohara | 501/64 |
| 6,546,753 B2 * | 4/2003 | Naka et al. | 65/134.3 |
| 6,989,633 B2 * | 1/2006 | Kunert et al. | 313/636 |
| 6,992,031 B2 * | 1/2006 | Naumann et al. | 501/69 |
| 7,137,278 B2 * | 11/2006 | Ott et al. | 65/134.3 |
| 7,390,761 B2 | 6/2008 | Fechner et al. | |
| 7,535,179 B2 * | 5/2009 | Hueber et al. | 313/636 |
| 7,553,786 B2 | 6/2009 | Fechner et al. | |
| 2004/0029702 A1 * | 2/2004 | Naumann et al. | 501/70 |
| 2004/0070327 A1 | 4/2004 | Bergmann et al. | |
| 2005/0085370 A1 * | 4/2005 | Fechner et al. | 501/64 |

FOREIGN PATENT DOCUMENTS

| | | |
|---|---|---|
| DE | 33 05 587 | 9/1983 |
| DE | 37 36 887 | 6/1988 |
| DE | 197 47 354 | 12/1998 |
| DE | 197 47 355 | 6/1999 |
| DE | 197 58 481 | 6/1999 |
| DE | 100 06 305 | 8/2001 |
| DE | 100 22 769 | 11/2001 |
| DE | 102 04 150 | 8/2003 |
| DE | 10 2004 048 097 | 4/2006 |

* cited by examiner

*Primary Examiner* — Anthony J Green
*Assistant Examiner* — Elizabeth A Bolden
(74) *Attorney, Agent, or Firm* — Michael J. Striker

(57) ABSTRACT

The alkaline earth metal aluminosilicate glass for light bulbs with molybdenum parts has a composition (in percent by weight on an oxide basis) of $SiO_2$, 56-60; $Al_2O_3$, 17-18; $B_2O_3$, 0.5-2; MgO, 0.5-2; CaO, >14-15.5; SrO, 0-3; BaO, 6-8; $ZrO_2$, 0-5; $CeO_2$, 0-0.1 and $TiO_2$, 0-0.5.

11 Claims, No Drawings

HIGHLY THERMALLY STRESSABLE GLASS FOR LIGHT BULBS AND ITS USE

CROSS-REFERENCE

The invention described and claimed herein below is also described in German Patent Application 10 2009 039 071.5, filed Aug. 27, 2009 in Germany. The aforesaid German Patent Application, whose subject matter is incorporated herein by reference thereto, provides the basis for a claim of priority of invention for the invention claimed herein below under 35 U.S.C. 119 (a)-(d).

BACKGROUND OF THE INVENTION

1. The Field of the Invention

The invention relates to an alkaline earth metal aluminosilicate glass for light bulbs, the light bulbs having molybdenum parts, in particular for light bulbs having bulb temperatures of more than 700° C., and also its use.

2. The Description of the Related Art

Glasses for high-temperature lamps, which generally mean lamps having bulb temperatures from 550° C. upwards, must meet demanding requirements.

Possible glasses are alkaline earth metal alumino(boro) silicate glasses. The glasses must be essentially free of alkali metal oxides, since alkali metal ions interfere in the regenerative halogen cycle of the lamp. This is because during operation of the lamp, an equilibrium is established between formation and decomposition of tungsten halides due to reaction of the tungsten vapor from the filament and the halogen/inert gas mixture. The decomposition reaction takes place at higher temperatures than the formation reaction, so that the tungsten re-deposits on the filament. If this cycle is disrupted by contaminating components, such as alkali metal ions, the tungsten deposits not on the filament but on the inside of the glass bulb as a black shiny interfering coating.

For use as light bulb glass for light bulbs that have molybdenum parts like electrodes or leads, the thermal expansion of the glass has to be matched to molybdenum so that gas-tight stress-free fusion of metal and glass is achieved.

A further requirement which a glass suitable for use as bulb glass for light bulbs must meet is suitability for the drawing of tubes. For this purpose, it must be sufficiently stable to crystallization.

Further requirements which the glass must meet are a high glass transition temperature $T_g$ and a low processing temperature $V_A$. A high glass transition temperature has the advantage that the glass is able to withstand a high thermal stress. A low processing temperature has the advantage that fusion can be carried out in a high yield with a relatively low energy input and the glass can be processed further economically. However, these properties usually run counter to one another.

DE 37 36 887 C2 describes $B_2O_3$-free low-CaO glasses. These glasses have the disadvantage of high processing temperatures.

Glasses requiring $B_2O_3$ are also known for incandescent light bulbs:

Thus, the glasses for fusion with molybdenum known from U.S. Pat. No. 3,310,413 contain from 4 to 9 percent by weight of $B_2O_3$. The sealing and bulb glasses known from DE 33 05 587 A1 also require from 3 to 7 percent by weight of $B_2O_3$ and also high proportions of BaO (from 11 to 16 percent by weight). Such high contents of $B_2O_3$, especially in combination with MgO, reduce the viscosity values so that these glasses are not suitable for halogen lamps having bulb temperatures of more than 650° C., for example about 700° C.

The low thermal stressability of the glasses leads to bulging of the light bulb which can proceed so far that the bulb explodes. An example of such a glass is the commercially available glass V0 having the composition (in percent by weight): 56.8, $SiO_2$; 16.4, $Al_2O_3$; 4.7, $B_2O_3$; 5.8, MgO; 7.8, CaO; and 8.0, BaO and having an upper cooling temperature UCP of 721° C.

The glasses known from DE 197 58 481 C1, DE 197 47 355 C1, DE 100 63 05 A1 and DE 10 2004 048 097 A1 also contain $B_2O_3$. They contain relatively little CaO and relatively little $Al_2O_3$. They do not simultaneously meet the requirements with respect of $T_g$ and $V_A$. The same applies to the glasses known from DE 100 22 769 A which contain relatively little CaO.

Furthermore, a low melting point of the glass is desirable.

SUMMARY OF THE INVENTION

It is an object of the invention to provide a glass which is highly thermally stressable and meets the above-mentioned requirements for a material for light bulbs having bulb temperatures of more than 700° C.

This object is attained by glasses defined by the appended claims.

This alkaline earth metal aluminosilicate glass has a very balanced ratio of constituents which vary only within relatively narrow limits in order to combine all desired properties.

The glass of the invention contains from 56 to 60 percent by weight of $SiO_2$. If the $SiO_2$ content were lower, the thermal expansion would become too great, while at higher contents it would be too low. In both cases, the glass would not be matched to Mo, which would result in halogen lamps which are not gas-tight. A content of from 56 to 58 percent by weight of $SiO_2$ is preferred.

The glass contains from 17 to 18 percent by weight of $Al_2O_3$. Deviations from this range would also lead to mismatched thermal expansions. Lower contents would reduce the glass transition temperature $T_g$, which would reduce the thermal stressability.

The glass contains from 0.5 to 2 percent by weight of $B_2O_3$. This results in precise matching of thermal expansions, and the fusibility is also improved. A $B_2O_3$ content of from 1.5 to 2 percent by weight is preferred.

$ZrO_2$ can be present in the glass in an amount of up to 5 percent by weight. Preference is given to $ZrO_2$ being present in the glass, particularly preferably in an amount of from 0.2 to 5 percent by weight. Very particular preference is given to a content of not more than 2 percent by weight. The $ZrO_2$ content of the glass contributes to achievement of the desired high glass transition temperature $T_g$, in particular $\geq 780°$ C.

The glass preferably has a weight ratio of $B_2O_3$ to $ZrO_2$ (in each case in % by weight) of $\geq 2$. This simplifies dissolution of the sparingly soluble $ZrO_2$ in the glass during the melting process. A weight ratio of $B_2O_3$ to $ZrO_2$ of $>2$ is particularly preferred.

The glass contains alkaline earth metal oxides within particularly narrow limits:

BaO is present in an amount of from 6 to 8 percent by weight (preferably 7-8 percent by weight) and CaO is present in an amount of from >14 to 15.5 percent by weight (preferably from 14.1 to 15.5 percent by weight) in the glass. Furthermore, the glass can contain up to 3 percent by weight of SrO. SrO increases the viscosity in a similar way to BaO. The high BaO content is helpful in suppressing increased blackening of the lamp (deposits on the inside of the outer bulb) and formation of white deposits (likewise on the inside of the outer bulb) during operation of the lamp. The tendency for crystallization to occur during the production process, in particular, is likewise reduced or completely suppressed. In particular, the particularly critical formation of anorthite, a Ca—Al silicate, which would lead to defects in the glass during drawing of tubes is suppressed. Surprisingly, this is also the case at the relatively high $Al_2O_3$ contents and high CaO contents prevailing here. A low processing temperature is advantageously achieved as a result of the high CaO content.

The glass contains from 0.5 to 2 percent by weight of MgO. Additions of MgO, especially to an aluminosilicate glass containing CaO and BaO, contribute to strengthening of the glass framework. The MgO content supports the high crystallization stability of the glass which is necessary for the tube manufacturing process.

Preference is given to an MgO content of at least 1.5 percent by weight of MgO.

It has been found that a weight ratio of CaO to $B_2O_3$ (in each case in percent by weight) of from >7.5 to 15.0 is advantageous for achieving a combination of the actually contrary properties of high $T_g$ and low $V_A$. For the same reason, a value of $(CaO/B_2O_3) \times Al_2O_3$ (in each case in % by weight) of from 130 to 260 is advantageous.

In the highly thermally stressed lamps, the halogen filling is generally a bromide- and/or chloride-containing gas and impurities from the glass and from the filament, for example alkali metal ions react with the bromide or chloride to form alkali metal bromides and/or alkali metal chlorides which deposit as a white precipitate on the inside of the glass of the bulb. This reduces the halogen concentration and interferes with or breaks down the regenerative halogen cycle in the lamp. The content of alkali metal oxides in the glass is therefore important. It should be low. The alkali metal content can be kept low by using raw materials with a low alkali metal content and by providing clean conditions in the preparation of the mix and in the loading part of the melting tank.

The water content is also important.

The requirements for a very low content of alkali metal oxides and of water are more demanding, the higher the operating temperatures of the lamp. In the case of the glasses of the invention which are suitable for use as bulb material for light bulbs having bulb temperatures of more than 700° C., the alkali metal oxide content is preferably limited to less than 0.03 percent by weight (preferably to $Na_2O+K_2O<200$ ppm) and the water content is preferably limited to less than 0.03 percent by weight. As a result, blackening is reduced even at the above-mentioned high temperatures and after prolonged operation of the lamp, due, inter alia, to the total balanced composition.

A person skilled in the art would know how the water content can be kept sufficiently low by choice of the raw materials and the melting conditions and choice of parameters during operation of the melting tank. Preference is given to a content of from 0.01 to <0.03 percent by weight of water.

$CeO_2$ in the glass affects a shift in the UV absorption edge to longer wavelengths. In addition, it acts as a refining agent. It has been found that $CeO_2$ reduces the interfering halide deposits on the inside of the bulb, and the blackening during operation of the lamp will also be reduced in this way.

The glass of the invention can, for this purpose, also contain up to 0.1 percent by weight of $CeO_2$. Higher contents would lead to an undesirable yellowing of the glass. Preference is given to from 0 to 0.05 percent by weight of $CeO_2$.

The glass can also contain further conventional refining agents in amounts customary for halogen lamp glasses.

Furthermore, the glass can also contain up to 0.5 percent by weight of $TiO_2$. This component shifts the UV edge to the longer-wavelength spectral region to a lesser degree than $CeO_2$. Preference is given to a content of not more than 0.4 percent by weight of $TiO_2$. Particular preference is given to a content of at least 0.05 percent by weight of $TiO_2$.

Furthermore, the glass can contain conventional additives such as $MoO_3$ and/or $Bi_2O_3$ in customary amounts. The glass is preferably free of $MoO_3$ and $Bi_2O_3$.

EXAMPLES

To produce the examples of the glasses of the invention and the comparative glasses, the raw materials for the oxide components, e.g. silica sand, aluminium oxide, magnesium carbonate, calcium carbonate and barium carbonate and also zircon sand, with low alkali metal content were used in each case. The well homogenized mixture was melted in the laboratory in a Pt/Rh crucible at from 1600 to 1680° C., refined and homogenized. The glass was subsequently drawn off vertically in a laboratory tube drawing unit. The glasses were free of interfering crystals.

The comparative glasses were melted at the same temperatures as the glasses of the examples, but this made somewhat longer melting times than in the case of the glasses of the examples necessary.

Table 1 lists seven examples of glass compositions according to the invention (A) and also three examples of comparative compositions (C) together in percent by weight on an oxide basis) and their important properties. Apart from the glass transition temperature ($T_g$) and the temperature at a viscosity of $10^4$ dPas ($V_A$), the coefficient of thermal expansion $\alpha_{20/300}$ $[\times 10^{-6}/K]$ is reported.

TABLE 1

Working Examples (A) and Comparative Examples (C) of the Glass Compositions (in % by weight) and their Important Properties

| | C1 | C2 | C3 | A1 | A2 | A3 | A4 | A5 | A6 | A7 |
|---|---|---|---|---|---|---|---|---|---|---|
| $SiO_2$ | 60.8 | 59.2 | 58.3 | 57.9 | 57.9 | 57.4 | 58.9 | 57.4 | 56.9 | 57.3 |
| $Al_2O_3$ | 16.2 | 14.7 | 15.7 | 17.5 | 17.5 | 17.5 | 17.5 | 17.5 | 18 | 17.5 |
| $Fe_2O_3$ | 0.05 | 0.05 | 0.05 | 0.05 | 0.05 | 0.05 | 0.05 | 0.05 | 0.05 | 0.05 |
| $Na_2O + K_2O$ | <0.03 | <0.03 | <0.03 | <0.03 | <0.03 | <0.03 | <0.03 | <0.03 | <0.03 | <0.03 |
| CaO | 13.1 | 10.4 | 10.6 | 14.1 | 15 | 15.5 | 14.5 | 15 | 15 | 14.1 |
| MgO | 0.15 | 2.5 | 0.94 | 0.5 | 0.5 | 0.5 | 0.5 | 0.5 | 0.5 | 2 |
| $TiO_2$ | 0.05 | 0.05 | 0.39 | 0.05 | 0.05 | 0.05 | 0.05 | 0.05 | 0.05 | 0.05 |
| $ZrO_2$ | 1.1 | 0.05 | 0.99 | 0.5 | 0.5 | 0.5 | 0.5 | 0.5 | 0.5 | 0.5 |
| BaO | 8 | 8.9 | 11.1 | 8 | 7 | 7 | 7 | 7.5 | 7 | 7 |
| $B_2O_3$ | 0.6 | 4.2 | 1.9 | 1.5 | 1.5 | 1.5 | 1 | 1.5 | 2 | 1.5 |
| $H_2O$ | <0.03 | <0.03 | <0.03 | <0.03 | <0.03 | <0.03 | <0.03 | <0.03 | <0.03 | <0.03 |
| $T_g$ [° C.] | 785 | 712 | 768 | 781 | 782 | 782 | 781 | 782 | 782 | 776 |
| $V_A$ [° C.] | 1298 | 1232 | 1288 | 1266 | 1255 | 1250 | 1272 | 1254 | 1252 | 1258 |
| $\alpha_{20/300}$ $[10^{-6}/K]$ | 14.7 | 4.6 | 4.6 | 4.9 | 4.9 | 4.9 | 4.8 | 4.9 | 4.9 | 4.9 |

Comparative example C1 has a high $T_g$ but also a relatively high $V_A$. Although comparative example C2 has a low $V_A$, it also has a low $T_g$. Comparative example C3 has an excessively high $V_A$ and a $T_g$ which is too low for high bulb temperatures.

In contrast, the glasses according to the invention combine, as made clear by the working examples, a high glass transition temperature $T_g$ of at least 780° C. with a low processing temperature of from 1250 to 1275° C.

The $T_g$ of at least 780° C. of the glasses shows that they are highly thermally stressable and suitable for use as bulb material for light bulbs having bulb temperatures of more than 700° C. even in the lamp test. The coefficients of thermal expansion $\alpha_{20/300}$ of from $4.6\times10^{-6}$/K to $4.9\times10^{-6}$/K of the glasses according to the invention show that they have the correct expansion behavior for good fusibility with molybdenum, which leads to gas-tight and stress-free fusion.

The low processing temperatures of the glasses according to the invention show that they are readily processed.

It is advantageous that they can be melted on an industrial scale at temperatures of not more than 1680° C.; higher temperatures would be necessary for production of the comparative examples. As a result of the low melting point, the energy costs necessary for production are lowered and the operating life of the tanks is considerably increased.

The glasses of the invention are sufficiently crystallization-stable.

The properties indicated make the glasses of the invention highly suitable for economical production by drawing off tubes and for use as bulb material for light bulbs having bulb temperatures of more than 700° C.

While the invention has been illustrated and described as embodied in a highly thermally stressable glass for light bulbs and its use, it is not intended to be limited to the details shown, since various modifications and changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed is new and is set forth in the following appended claims.

We claim:

1. An alkaline earth metal aluminosilicate glass for light bulbs, said light bulbs having molybdenum parts, said alkaline earth metal aluminosilicate glass comprising in percent by weight on an oxide basis:

| | |
|---|---|
| $SiO_2$ | 56-60 |
| $Al_2O_3$ | 17-18 |
| $B_2O_3$ | 0.5-2 |

-continued

| | |
|---|---|
| MgO | 0.5-2 |
| CaO | >14-15.5 |
| SrO | 0-3 |
| BaO | 6-8 |
| $ZrO_2$ | 0-5 |
| $CeO_2$ | 0-0.1 |
| $TiO_2$ | 0-0.5. |

2. The glass according to claim 1, containing greater than 0 percent by weight of $ZrO_2$ and wherein a weight ratio of $B_2O_3$ to $ZrO_2$ is greater than or equal to 2.

3. The glass according to claim 2, wherein said weight ratio of $B_2O_3$ to $ZrO_2$ is greater than 2.

4. An alkaline earth metal aluminosilicate glass for light bulbs, said light bulbs having molybdenum parts, said alkaline earth metal aluminosilicate glass comprising in percent by weight on an oxide basis:

| | |
|---|---|
| $SiO_2$ | 56-58 |
| $Al_2O_3$ | 17-18 |
| $B_2O_3$ | 1.5-2 |
| MgO | 1.5-2 |
| CaO | 14.1-15 |
| BaO | 7-8 |
| $ZrO_2$ | 0.2-5 |
| $CeO_2$ | 0-0.05 |
| $TiO_2$ | 0-0.4. |

5. The glass according to claim 1, having an alkali metal oxide content of less than 0.03 percent by weight and/or a water content of less than 0.03 percent by weight.

6. The glass according to claim 1, containing less than 200 ppm of a sum total amount of $Na_2O$ and $K_2O$ and/or from 0.01 to less than 0.03 percent by weight of water.

7. The glass according to claim 1, containing not more than 2 percent by weight of $ZrO_2$.

8. The glass according to claim 1, wherein a product of an amount of $Al_2O_3$ present in the glass in percent by weight and a weight ratio of CaO to $B_2O_3$ is from 130 to 260 percent by weight.

9. The glass according to claim 1, in which a weight ratio of CaO to $B_2O_3$ is from greater than 7.5 to 15.0.

10. The glass according to claim 1, having a coefficient of thermal expansion $\alpha_{20/300}$ in a range from $4.6\cdot10^{-6}$/K to $4.9\cdot10^{-6}$/K, a glass transition temperature $T_g$ of at least 780° C. and a processing temperature $V_A$ of from 1250 to 1275° C.

11. A light bulb having bulb temperatures of more than 700° C., said light bulb comprising a glass according to claim 1.

* * * * *